US012692780B2

(12) United States Patent
Makkar et al.

(10) Patent No.: US 12,692,780 B2
(45) Date of Patent: Jul. 28, 2026

(54) ANTENNA ARRAY FOR TRACKING AN OBJECT

(71) Applicant: Grant Prideco, Inc., Houston, TX (US)

(72) Inventors: Ankur Makkar, Austin, TX (US); Jaideva C. Goswami, Sugar Land, TX (US)

(73) Assignee: Grant Prideco, Inc., Houston, TX (US)

( * ) Notice: Subject to any disclaimer, the term of this patent is extended or adjusted under 35 U.S.C. 154(b) by 0 days.

(21) Appl. No.: 18/733,303

(22) Filed: Jun. 4, 2024

(65) Prior Publication Data

US 2024/0401469 A1 Dec. 5, 2024

Related U.S. Application Data

(60) Provisional application No. 63/471,084, filed on Jun. 5, 2023.

(51) Int. Cl.
| | |
|---|---|
| *E21B 47/09* | (2012.01) |
| *E21B 17/00* | (2006.01) |
| *E21B 47/0228* | (2012.01) |
| *E21B 47/13* | (2012.01) |
| *G06K 7/10* | (2006.01) |

(52) U.S. Cl.
CPC .......... *E21B 47/09* (2013.01); *E21B 47/0228* (2020.05); *E21B 47/13* (2020.05); *E21B 17/006* (2013.01); *G06K 7/10356* (2013.01)

(58) Field of Classification Search
CPC ...... E21B 47/0228; E21B 47/09; E21B 47/13; E21B 17/006; G06K 7/10356
See application file for complete search history.

(56) References Cited

U.S. PATENT DOCUMENTS

| | | | | |
|---|---|---|---|---|
| 4,698,631 A | * | 10/1987 | Kelly, Jr. .............. | E21B 47/092 |
| | | | | 340/854.6 |
| 2012/0212326 A1 | | 8/2012 | Christiansen et al. | |
| 2014/0110474 A1 | * | 4/2014 | Koliyot ................ | E21B 17/006 |
| | | | | 235/492 |

FOREIGN PATENT DOCUMENTS

| | | | | |
|---|---|---|---|---|
| WO | 2022146187 | 7/2022 | | |
| WO | WO-2022146187 A1 | * | 7/2022 | .............. E21B 7/04 |
| WO | WO-2023114976 A1 | * | 6/2023 | ......... G06K 7/10415 |
| WO | 2024254069 | 12/2024 | | |

OTHER PUBLICATIONS

Kondratiev et al., PCT No. WO 022146187 A1, English translation dated 2025. (Year: 2022).*
"International Application Serial No. PCT US2024 032406, Invitation to Pay Additional Fees mailed Oct. 16, 2024", 4 pgs.
"International Application Serial No. PCT US2024 032406, International Search Report mailed Dec. 10, 2024", 7 pgs.

(Continued)

*Primary Examiner* — Caroline N Butcher
(74) *Attorney, Agent, or Firm* — Schwegman Lundberg & Woessner, P.A.

(57) ABSTRACT

A system for tracking drilling tubulars may include a tag arranged on a drilling tubular and an antenna array comprising a plurality of antennas configured for capturing data from the tag. The plurality of antennas may be arranged in a radial pattern, and facing inward toward a longitudinal axis. The antenna array may be arranged below a drill floor of a drill rig, within a mud containment system, and above a drilling mud fluid level.

5 Claims, 8 Drawing Sheets

(56)　　　　　　References Cited

OTHER PUBLICATIONS

"International Application Serial No. PCT US2024 032406, Written Opinion mailed Dec. 10, 2024", 9 pgs.
"International Application Serial No. PCT US2024 032406, International Preliminary Report on Patentability mailed Sep. 18, 2025", 11 pgs.

\* cited by examiner

900

902

Pass responding device within a proximity of at least one antenna

904

Detect an electromagnetic field strength between the antenna/s and the responding device

906

Adjust the distance or orientation of the at least one antenna based on the detected electromagnetic field strength

ANTENNA ARRAY FOR TRACKING AN OBJECT

TECHNOLOGICAL FIELD

The present application relates to pipes in a drilling environment. More particularly, the present application relates to detecting pipes and data related to those pipes. Still more particularly, the present application relates to configuring antenna arrays to detect responsive elements on pipes.

BACKGROUND

The background description provided herein is intended to generally present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various tubular objects are used in drilling and production from subterranean wells. During drilling, a drill bit is secured to one end of a drill string of individual lengths of pipe. These lengths can be joined together. The drill bit can be fluid driven by pumping fluid down the drill pipe to power the drill bit to permit the bit to penetrate the earth. As drilling progresses, additional lengths of drill pipe are secured to the uppermost length of drill pipe. Hundreds or even thousands of lengths of drill pipe may be added, and proper identification and inspection of these pipes is important to inventory and lifecycle management.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more embodiments, a system for tracking drilling tubulars may include a tag arranged on a drilling tubular and an antenna array comprising a plurality of antennas configured for capturing data from the tag. The plurality of antennas may be arranged in a radial pattern and facing inward toward a longitudinal axis. The antenna array may be arranged below a drill floor of a drill rig, within a mud containment system, and above a drilling mud fluid level.

In one or more other embodiments, a system can include a tubular object having attached thereto at least one responding device. The system can include at least one antenna within a proximity of the responding device, the at least one antenna being spaced at an initial distance from the object or at an initial orientation with respect to the object. The system can include control circuitry coupled to the at least one antenna. The control circuitry can detect an electromagnetic field strength between the at least one antenna and the responding device. The system can include position control circuitry coupled to the control circuitry and to the at least one antenna. The position control circuitry can receive a control signal from the control circuitry to adjust the distance or orientation of the at least one antenna based on the detected electromagnetic field strength. The position control circuitry can change the orientation or the distance of the at least one antenna based on the control signal.

In one or more embodiments, a non-transitory computer-readable medium can include instructions to cause processing circuitry to perform a number of operations. The operations can include detecting an electromagnetic field strength between at least one antenna and a responding device attached to an object. The operations can include controlling position control circuitry to adjust a distance or orientation of the at least one antenna, relative to the object, based on the detected electromagnetic field strength.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present application, in one or more embodiments, describes methods and systems for tracking tubular assets or objects (e.g., drill pipes). In some embodiments, tracking is done by providing a responding device (e.g., Radio Frequency Identification (RFID) tags) mounted on pipes in a drilling environment. An antenna or, more typically an array of antennas, can be provided at a stage on the drilling rig before the pipes are tripped downhole. This antenna/antenna array creates an electromagnetic field proximate the pipe. As the pipes move while drilling or tripping, the responding devices (e.g., RFID tags) mounted on the pipes interact with this electromagnetic field. Such interactions are received by control circuitry either remote or local to the drilling rig, the tags can be identified and the associated pipes thereby tracked, analyzed, etc. The placement of the antennas should be controlled or adjusted to maximize or optimize electromagnetic field strength for improved detectability and reliability and for improved data acquisition and processing.

Figure 1:
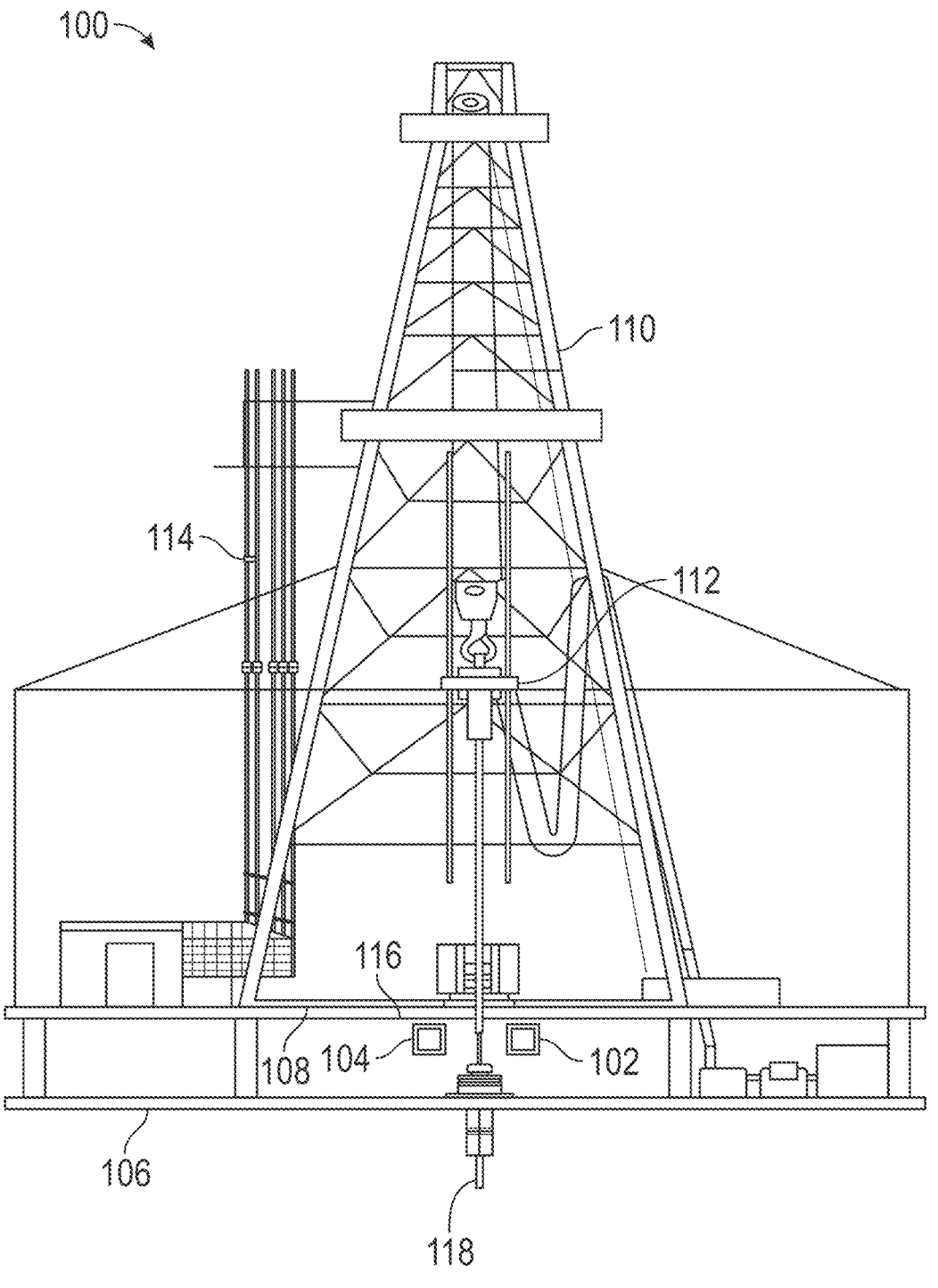
FIG. 1 is a perspective view of a drill rig including antennas for tracking tubular assets, according to one or more embodiments.

FIG. 1 is a perspective view of a drill rig 100 according to one or more embodiments. The rig 100 may be placed at a well site and may be adapted for drilling a well. The drill rig 100 may include a base 106 for supporting the rig 100 on a surface, a drill floor 108 for, among other things, personnel to make and/or disconnect drill pipe connections, and a mast 110 for supporting the drill string manipulation equipment such as a top drive 112. The top drive 112 may be used for manipulating and/or controlling the drill string as well as adding or removing tubular objects 114 (e.g., drill pipes from the drill string.

The top drive 112 may be a mechanized system configured for lifting sections of drill pipe or pipe stands to connect or disconnect the sections or stands from the drill string. The top drive may also be configured for carrying, supporting, and/or manipulating the entire drill string during drilling operations and/or during tripping of the drill string into or out of the well. Still further, the top drive may be configured for delivering drilling fluid to the drill string 118 to control drilling operations within the well.

Figure 2:
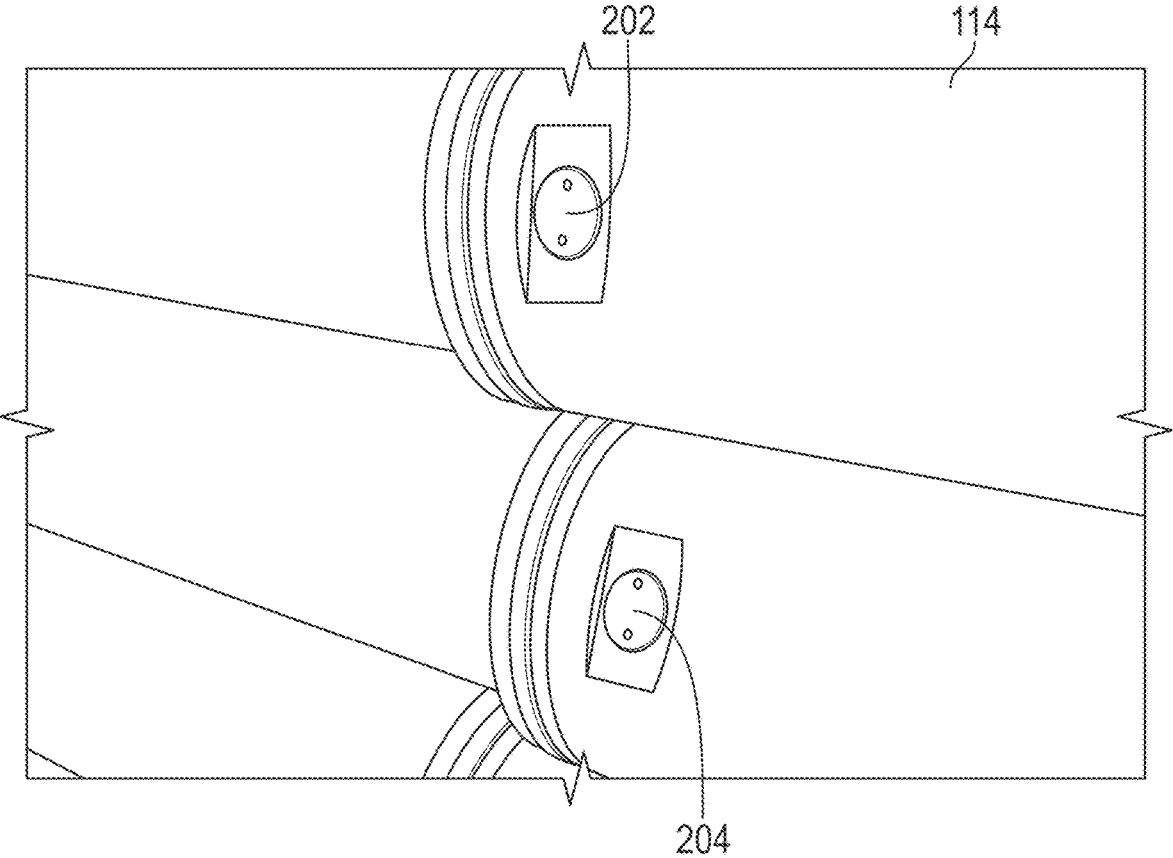
FIG. 2 illustrates tubular objects having responding devices attached thereto.

The rotary table 116 provides rotational force to the drill string 118 to facilitate the process of drilling a borehole. Rotational force can alternatively be provided by the top drive 112. Pipes or drill string 118 portions may be tracked by drill rig operators/owners to provide inventory management. This tracking can be accomplished using devices such as RFID tags. FIG. 2 illustrates tubular objects 114 having responding devices (e.g., RFID tags) 202, 204 attached thereto. The tags 202, 204 can contain information about specific tubular objects 114. This information can include the serial number of a given tubular object 114, which can be further linked to material, properties, manufacturing, maintenance, and other information. Depending upon the available memory in the tags 202, 204, more parameters can be included. This information can also be used to determine when a pipe was placed downhole, the pipe's position on the drill string 118, and the time when the pipe was removed from the borehole. An inspection aspect can also be provided, for example, where multiple RFID tags are provided on the pipe at different locations. The relative position of the multiple tags can be analyzed as the pipe goes downhole (e.g., passes by an array of antennas) and compared to positions after the pipe comes out of the borehole. If the relative position of the tags changes, this can indicate stress, stretching, or other issues with the respective pipe. In some cases, this data can be used to make decisions about removing a pipe from service and may provide for the ability to plan for the same.

In a typical drilling process, hundreds or even thousands of tubular objects 114 (e.g., pipes) can be provided on a drill string and equipped with one or more RFID tags similar to tags 202, 204. Proper identification and inspection of these pipes can be helpful to inventory operations, maintenance operations, and lifecycle management.

RFID detection systems available today may use a coil antenna and operate by moving pipes within this coil. As the RFID tags attached to the pipes move through the coil, the tags can be read to obtain information on the corresponding pipe. However, this coil-based system suffers from various shortcomings. First, the coil-based detection system works most effectively with low-frequency tags, which reduces the detection range. Second, a coil-based system is not easily scalable, in the sense that adjustments cannot easily be made for different pipe sizes.

Referring again to FIG. 1, therefore, systems according to embodiments can provide one or more antennas 102, 104 in an array. Antennas 102, 104 can be moved closer or further apart (e.g., the radial coordinate r (with reference to FIG. 4) can be increased or decreased for each antenna) depending on pipe 114 size, and furthermore antennas 102, 104 can be operated at higher frequencies for improved detection range, as described herein. Two antennas 102, 104 are shown for clarity but more antennas can be included.

Figure 3:
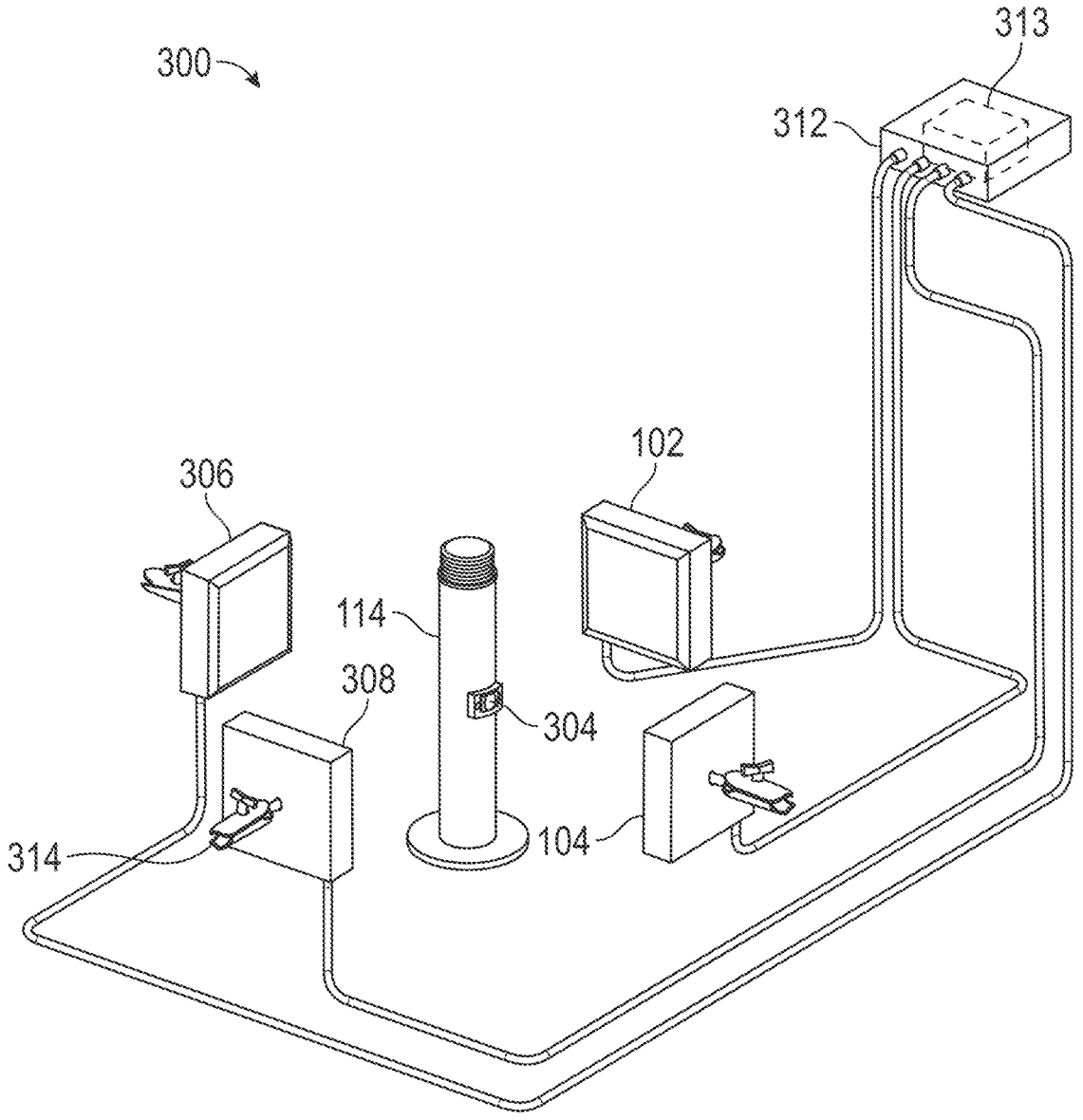
FIG. 3 is a system for tracking objects, according to one or more embodiments.

FIG. 3 is a system 300 for tracking objects, according to one or more embodiments. The system 300 can include a tubular object 114, which can be similar to pipe 114 (FIG. 1) or any portion of drill string 118 (FIG. 1) having attached thereto at least one responding device 304. The system 300 can include at least one antenna (more typically an array of antennas 102, 104, 306, 308) within a proximity of the responding device 304. The antenna/s 102, 104, 306, 308 can be spaced at an initial distance from the object 114 or at an initial orientation with respect to the object 114. The initial distance and the initial orientation can take into account pipe diameter or other fixed or near-fixed parameters of the pipe, drill string, or drilling operation. The antennas 102, 104, 306, 308 can be the same or similar to antennas 102, 104 (FIG. 1). While four antennas 102, 104, 306, 308 are shown, any number of antennas from one antenna to 32 antennas or more can be provided.

It is to be appreciated that while an initial orientation has been mentioned, more permanent installations may be provided where the antennas are not adjustable with respect to position or orientation. In either case, whether as an initial installation or a more permanent or less adjustable installation, a wide variety of positions and orientations may be provided. For example, an antenna array arranged about a drilling tubular may be arranged in a radial pattern defining an array diameter. Each antenna of the antenna array may face radially inward toward a longitudinal axis of the drilling tubulars. The antennas within the array may be configured for establishing a electromagnetic field adapted for capturing data from the RFID tag as the drilling tubular moves along the longitudinal axis. In one or more examples, the electromagnetic field may extend above and below the array along the longitudinal axis and may define a field window. The antennas within the array may be configured to "fire" in series at a cycle time where consecutive, or nonconsecutive, antennas in the array are "fired," for example, every 50 ms. In one or more examples, a cycle time may be provided of approximately 5 ms to approximately 100 ms or from approximately 10 ms to approximately 50 ms, or approximately 20 ms to approximately 40 ms, or a cycle time of approximately 25 ms, approximately 30 ms, or approximately 35 ms may be provided. In one or more examples, the array diameter may range from approximately 12 inches to approximately 108 inches or from approximately 48 inches to approximately 84 inches, or from approximately 54 inches to approximately 66 inches. Still other diameters such as 24 inches, 36 inches, 48 inches, 54 inches, 60 inches, 66 inches, 72 inches, 78 inches, 84 inches, or 90 inches may be provided. Still other diameters not falling on 6-inch or 12-inch increments may be provided.

In some examples, and as shown in FIG. 2, the antenna array may be arranged below the drill floor. In some examples, this may involve arranging the antenna array within the mud containment system. In some examples, a mud fluid level may occur where the mud is diverted out of the mud containment system to a mud treatment system. In one or more examples, the antennas may be arranged above the mud fluid level to avoid submersing the antennas in the mud.

The inventors have realized that for various circumstances and conditions, the position and orientation of the antennas may be varied to increase the field window, thus, providing a better ability to capture information about the tubulars from the tags as the tubulars move through or passed the array at relatively high speeds. In one or more examples, the field window may range from approximately 4 inches to approximately 24 inches or from approximately 6 inches to approximately 18 inches or from approximately 12 inches to approximately 15 inches. Various positions and orientations of the antennas may be provided to adjust the length of the field window along the length of the tubulars and, as such, provide for a better ability to capture data. In particular, as the diameter of the array increases, the array may generally be less capable of capturing information along the full length of the field window. In some examples, a 12-inch field window, for example, may be difficult to establish when the array diameter is 60 inches or greater when attempting to provide for both US and European frequency standards (Global set up). In other examples, a 12-inch field window, for example, may be difficult to establish when the array diameter is 84 inches or greater when attempting to provide for either the US or the European frequency standard (Regional set up). However, through the use of various positioning/orientation techniques, the inventors have been able to establish a 12-inch field window at the mentioned diameters of 60 inches for a Global set up and 84 inches for a regional set up.

Regarding the various positioning/orientation techniques, for example, one or more antennas may be arranged out of plane of the other antennas. For example, in FIG. 3, the horizontal centerline of each of the antennas may all be arranged in a single plane. However, in some examples, the horizontal centerline of any given antenna may be arranged out of plane and where multiple antennas are arranged out of plane, there may be two or more separate arrays arranged out of plane of the first array. In some cases, the antennas that are arranged out of plane may be staggered with the in-plane antennas such that every other antenna around the array is in plane and the antenna between them is out of plane. In some other cases, adjacent pairs, sets of three, other numbered sets of antennas around the array may be arranged out of plane followed by an equal number, or unequal number, of in plane antennas. In one or more examples, pair or sets of antennas may be staggered where more than two pairs or sets are provided.

In another example, an antenna array may be provided where some antennas are oriented in an upright orientation and some antennas are oriented in an inverted orientation. With respect to upright versus inverted orientations, in some cases, the orientation may be staggered where every other antenna (e.g., along a circumferential path around the tubular and along the array) is upright and the antennas between the upright antennas are inverted. In other cases, a pair, a set of three, or a set of four antennas may be arranged in an upright orientation followed by an equal number of inverted antennas. For example, in the case of four antennas, two antennas that are adjacent to one another about the array may be arranged upright while the other two antennas are inverted. In still other cases, any given antenna or number of antennas in the array may be inverted while the other antennas are upright.

In still other examples, one or more antennas may be rotated about an axis extending horizontally through the antenna and orthogonally to the longitudinal axis of the tubular. In one or more examples, the antenna may be rotated from approximately 10 degrees to approximately 160 degrees, or from approximately 30 degrees to approximately 135 degrees, or from approximately 60 degrees to approximately 90 degrees, or the antenna may be rotated 45 degrees. Any combination of rotated antennas may be provided where, for example, all antennas are rotated or every other antenna about the array is rotated or pairs or sets of antennas about the array are rotated.

While in-plane and out-of-plane antennas, upright/inverted orientations, and rotated orientations have been described, these arrangements are not necessarily mutually exclusive. That is, combinations of in-plane and out-of-plane arrangements where any one or multiples of the antennas are arranged in an inverted or upright orientation or rotated orientation may also be provided.

The system 300 can include control circuitry 312 coupled to the antennas 102, 104, 306, 308. The control circuitry 312 can detect an electromagnetic field strength, as described later herein, between the antennas 102, 104, 306, 308 and the responding device 304. The system 300 can include position control circuitry 314 coupled to the control circuitry 312 and to the antennas 102, 104, 306, 308. The position control circuitry 314 can receive a control signal from the control circuitry 312 to adjust the distance of the antennas 102, 104, 306, 308 from responding device 304, or orientation with respect to the responding device 304 or other antennas 102, 104, 306, 308. This adjustment can be based on the detected electromagnetic field strength as discussed below.

Figure 4:
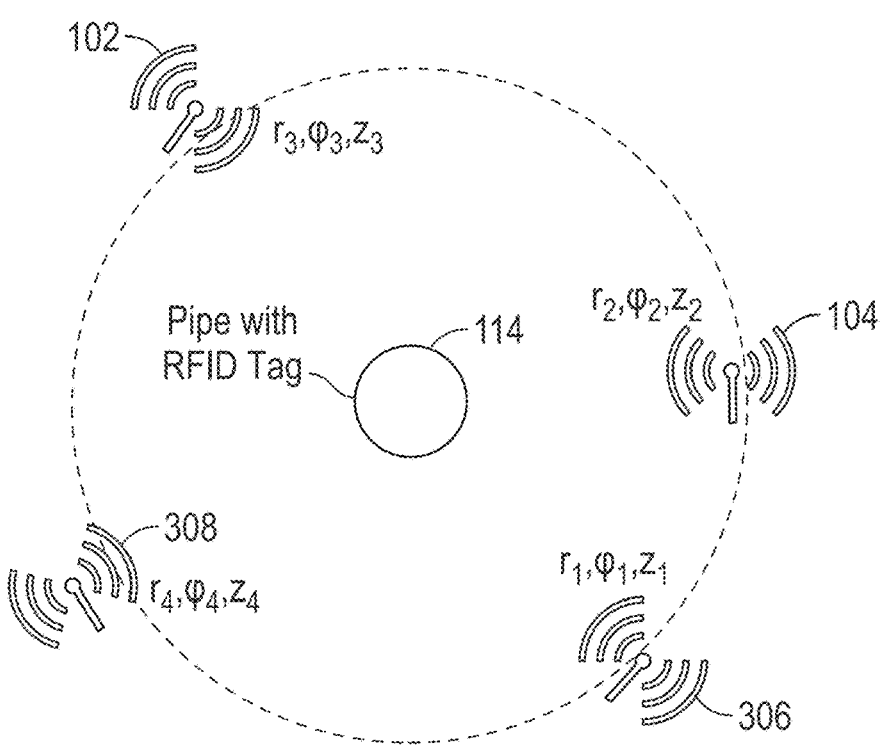
FIG. 4 is a top view of a tubular object and antenna array, according to one or more embodiments.

FIG. 4 is a top view of a tubular object 114 and antennas 102, 104, 306, 308 of an antenna array, according to one or more embodiments. Similar reference numerals are used to describe objects shown in FIG. 1-3. As such, the tubular object 114 shown in FIG. 4 can be similar to tubular object 114 (FIG. 1 and FIG. 3) and antennas 102, 104, 306, 308 can be similar to antennas 102, 104, 306, 308 (FIG. 1 and FIG. 3). While four antennas 102, 104, 306, 308 are shown (e.g., the antennas 102, 104, 306, 308 are 90 degrees apart), any number of antennas from one antenna to 32 antennas or more can be provided.

Antennas 102, 104, 306, 308 can operate at ultra-high frequency (UHF) up to about 1 GHz. In some examples, antennas 102, 104, 306, 308 can operate at even higher frequencies. In examples for RFID detection, European and the United States standard UHF frequency ranges for RFIDs are 865-868 megahertz (MHz) and 902-928 MHZ, respectively.

In general, the antennas 102, 104, 306, 308 can have arbitrary coordinates (r,φ,z) wherein r refers to a radial coordinate, φ refers to an azimuthal coordinate, and z refers to an axial coordinate, with origin being at the center of the responding device 304 (FIG. 3). Antennas 102, 104, 306, 308 should be placed for maximum or optimum detection range and reliability. Because a coil-based system is not used, and because antennas can be easily moved, systems can be easily adjusted to accommodate large-size pipes or to adjust larger or smaller as needed for to accommodate pipes during drilling operations.

Referring again to FIG. 3, responding device 304 can be mounted to the object 114 in any orientation. While rotating, the responding device 304 can face any azimuthal direction. The objects 114 (e.g., pipes) may be moving vertically, horizontally, or rotationally at any speed or at predefined speeds as required according to larger drilling operations and drill string configuration operations. Further, drilling mud or other obstructions may exist or be disposed between the antennas 102, 104, 306, 308 and the responding device 304. As these constraints and conditions vary, antenna 102, 104, 306, 308 placement, configuration, and operation should maximize or optimize responding device 304 detection, wherein reader circuitry 313 can detect the strength of the signal provided back from the antennas 102, 104, 306, 308. In mathematical terms, signal strength optimization can include optimizing electromagnetic field strength as described below. The strength can be used by the control circuitry 312 to decide whether antenna adjustment is needed. Reader circuitry 313 is shown as provided within control circuitry 312. Alternatively, or in addition, each antenna 102, 104, 306, 308 can include a local reader/control circuitry to communicate with a central hub in a wired or wireless manner. In at least these embodiments, the antenna/s 102, 104, 306, 308 can include a local power source, in which case the respective antenna/s 102, 104, 306 and 308 can be considered active (rather than passive) antennas.

Accordingly, control circuitry 312 should change the orientation or the distance of the antennas 102, 104, 306, 308, relative to the object 114, in response to changes in the electromagnetic field strength for example when the electromagnetic field strength falls below a predetermined threshold.

Figure 5:
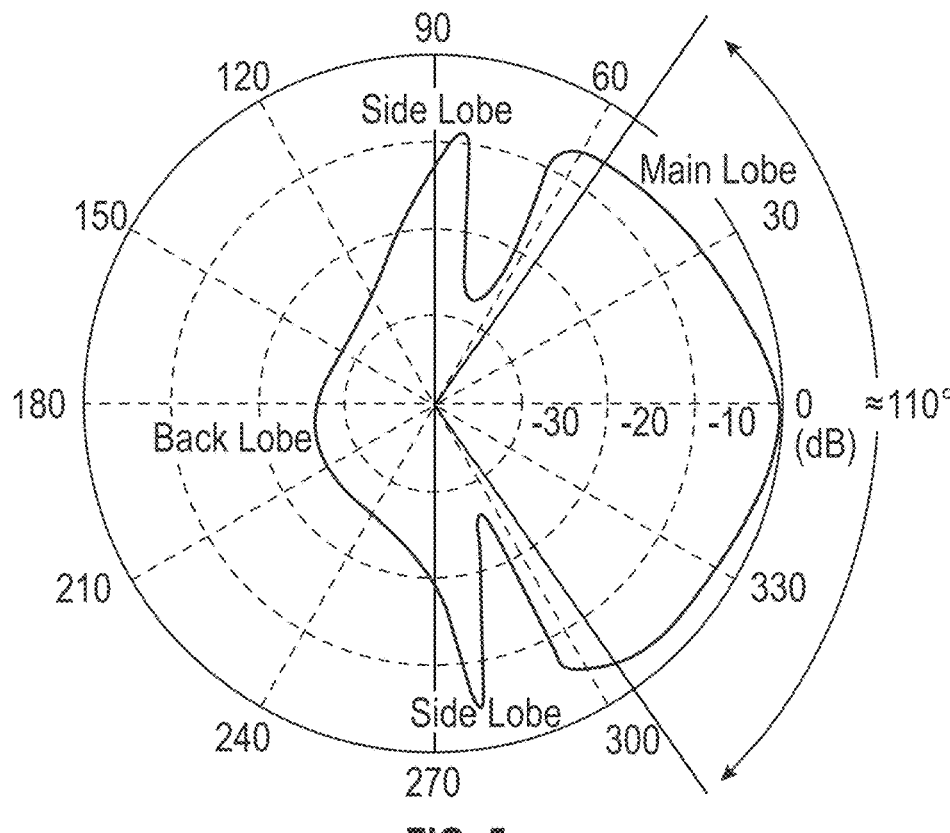
FIG. 5 is a radiation pattern of an antenna according to one or more embodiments.

The antennas 102, 104, 306, 308 can be energized sequentially or simultaneously. In sequential mode, one antenna (e.g., antenna 306) is energized for a specific duration and then the next antenna (e.g., antenna 308) is energized, etc. Such switching can take place at much faster rate than the rotational period and axial movement of the pipe. Each antenna 102, 104, 306, 308 has two radiation patterns, corresponding to the azimuthal (horizontal) and the elevation (vertical) planes. FIG. 5 is a radiation pattern of an antenna according to one or more embodiments. In the example of FIG. 5, a radiation pattern in the horizontal plane with about 110° beamwidth is shown. The pattern may not necessarily be symmetric.

The beamwidth of the antenna pattern indicates the region of interaction between the respective antenna 102, 104, 306, 308 and the responding device 304. For instance, if the responding device 304 is between −55° and 55° in front of an antenna whose pattern is indicated in FIG. 5, then the responding device 304 can be detected. Similar diagrams and detectability can be defined for the vertical plane. For example, a vertical plane pattern can be similar to a horizontal pattern except with a range of −180 degrees to 180 degrees (rather than the 0-360 degrees shown in the horizontal pattern of FIG. 5).

Figure 6A:
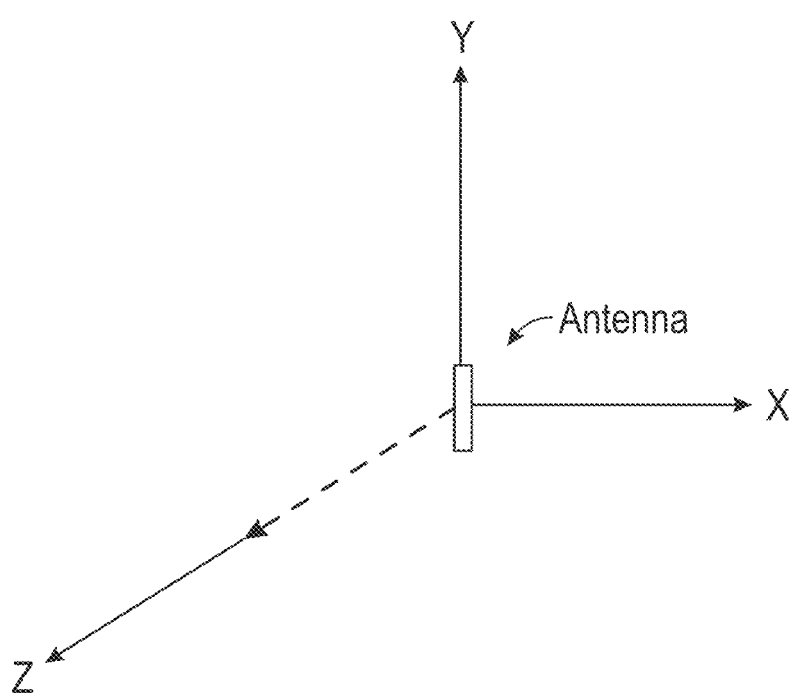
FIG. 6A illustrates an antenna plane according to some embodiments.
Figure 6B:
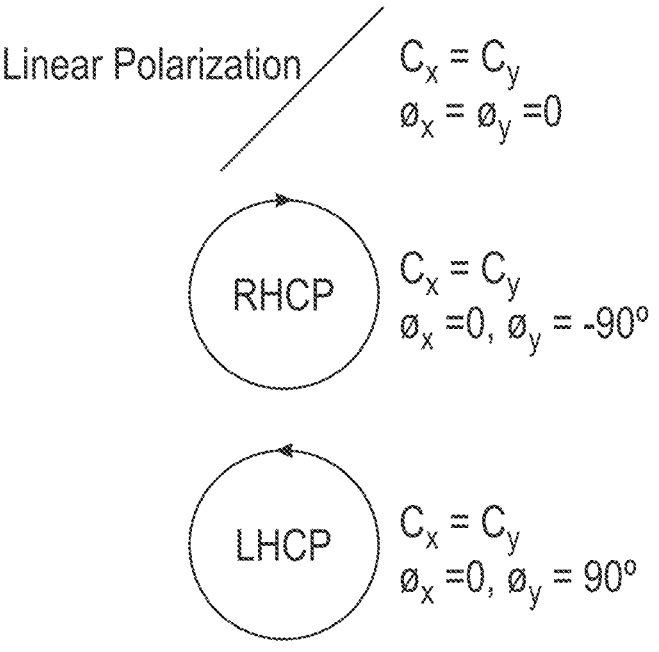
FIG. 6B illustrates antenna polarization according to some embodiments.

In addition to beamwidth being used to define detectability, variations in polarization can affect detection and control of antenna arrays. FIG. 6A illustrates an antenna plane according to some embodiments. FIG. 6B illustrates antenna polarization according to some embodiments. For a transverse electromagnetic wave propagating in the Z-direction, the x- and y-components of the electric field can be represented as:

$$\vec{E}(z, t) = \hat{x} \, C_x \, \cos(\omega t - \beta z + \phi_x) + \hat{y} \, C_y \, \cos(\omega t - \beta z + \phi_y) \tag{1}$$

where the first and second terms on the righthand side correspond to the x- and y-components of the electric field $\vec{E}(z,t)$. The amplitudes of the respective components are $C_x$, $C_y$, and phases $\phi_x$, $\phi_y$. The unit vectors are represented by $\hat{x}$ and $\hat{y}$, f is the antenna operating frequency, $\omega=2\pi f$ is the angular frequency, and B is the phase velocity.

If $C_x=0$, then the wave is said to be polarized along the y-direction. Similarly, an x-polarized wave will have $C_y=0$. If both are present and are in phase, then it leads to a linearly polarized wave at an angle, depending upon the relative magnitudes. An elliptically polarized wave occurs when there is a difference of phase between the two components. A circularly polarized wave is a special case of an elliptic polarization when the amplitudes are the same and the relative phase difference is 90°; the distinction between the lefthand and righthand-circular polarization depends upon the sign of the phase difference. In FIG. 6B, these are denoted as LHCP and RHCP, respectively.

For the case when the antennas 102, 104, 306, 308 are energized sequentially, the switching frequency can be determined based on antenna 102, 104, 306, 308 beamwidths, pipe rotation period, and the axial speed of the pipe. When all the antennas 102, 104, 306, 308 are operating simultaneously, the antennas 102, 104, 306, 308 can be placed in such a way that the radiation patterns of all antennas 102, 104, 306, 308 combine together to create a nearly axisymmetric pattern (meaning 360° of combined beamwidth) in the horizontal plane and nearly uniform vertical coverage. This allows reliable detection of a responding device 304 irrespective of its angular and axial position and improves controllability of the array.

When two or more radiating antennas 102, 104, 306, 308 are facing each other, the combined field can have potential null regions depending upon the polarization and positions of the interacting waves. In the null or low field regions, little or no communication may occur between the antenna 102, 104, 306, 308 and responding device 304, or the efficiency can be significantly reduced. A small movement of the antenna 102, 104, 306, 308, in the range of about a quarter wavelength, may mitigate such situation. For example, given that 908 MHz corresponds to a wavelength of 14 inches, if the distance between two antennas 102, 104, 306, 308 facing each other changes by about 3.5", the electromagnetic field distribution can be significantly altered.

Figures 7, 8:
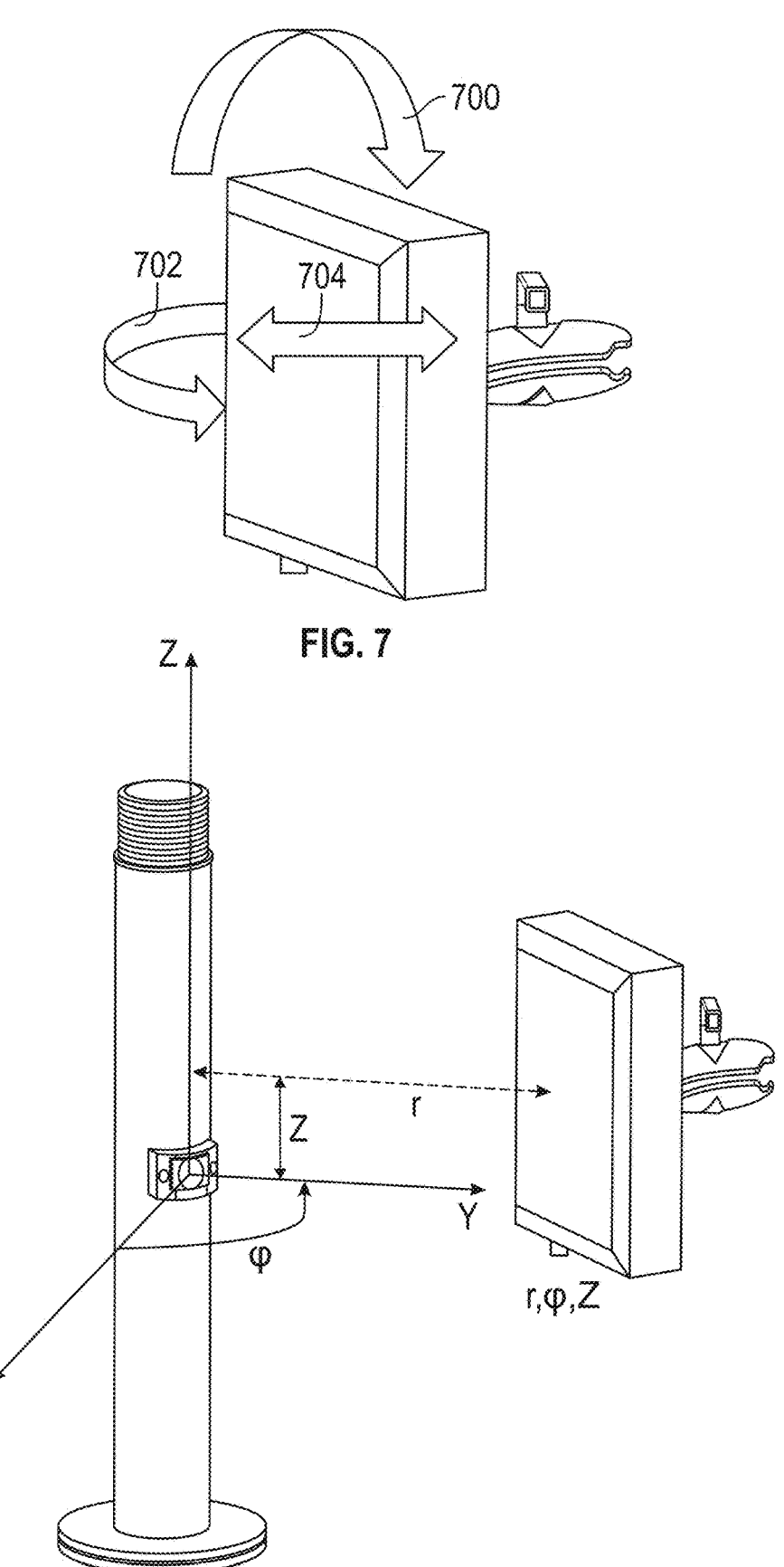
FIG. 7 illustrates options for antenna position control, according to one or more embodiments.
FIG. 8 illustrates a coordinate system in which antenna position control can occur, according to one or more embodiments.

FIG. 7 illustrates options for antenna position control, according to one or more embodiments. In system 300, each antenna 102, 104, 306, 308 can be equipped with a mechanism to control its axial, radial, and angular (both in azimuth and inclination) positions to maximize the detection capability. As such, position control circuitry 314 (FIG. 3) can adjust the orientation or the distance of the at least one antenna responsive to the object moving in a vertical direction, rotational direction/s 700, 702, or horizontal direction 704.

FIG. 8 illustrates a coordinate system in which antenna position control can occur, according to one or more embodiments. The position control circuitry 314 can adjust at least one of elevating or lowering the antenna in a Z direction, rotating the antenna clockwise in a plane about a Z axis rotating the antenna counterclockwise in the plane about the Z axis, and moving the antenna near or further from the responding device 304 along an r dimension.

Referring again to FIG. 3, in examples, more than one responding device 304 can be provided on each tubular object 114 (e.g., pipe). For example, a responding device 304 can be provided at either end of the tubular object (not shown in FIG. 3) or spaced around the circumference of the tubular object 114. Depending on relative position detected for each responding device 304, metal strain or warping can be detected. For example, knowing an original placement of multiple responding devices 304, relative position can be detected between the multiple devices (or known by the operator upon placement of the multiple responding devices). When the corresponding object (e.g., pipe) is removed from the borehole, if relative position of the multiple responding devices 304 has changed, this can indicate strain (e.g., mechanical strain of the metal) or stress in the form of longitudinal bending, out of round deformation, etc., which can help operators determine whether to replace the respective tubular object 114 or put the tubular object 114 out of service.

In some examples, the control circuitry 312 may initialize the orientation or the distance based on a size of the object 114. For example, given a known beamform of antennas 102, 104, 306, 308 and operating frequencies, then antennas 102, 104, 306, 308 can be positioned nearer together or nearer the responding device 304. Reader circuitry can be included in or coupled to control circuitry 312 to access data of the responding device 304 using the antennas 102, 104, 306, 308.

Systems according to any of the above-described embodiments are scalable to different diameters of pipes or other tubular elements. A plurality of antennas can be placed and adjusted/reoriented to improve data acquisition and processing of data stored on RFID tags or other similar responding devices. By using methods described herein, tubular object such as pipes that may be used in oil and gas drilling, can be detected and identified. Location of tubular objects can also be detected based on distance or location relative to detection antenna arrays described herein.

Single and multiple responding devices (e.g., RFID tags, although embodiments are not limited thereto) can be detected. Responding devices (as well as corresponding tubular objects by extension) can be stationary or moving. In addition to the responding devices being embedded in pipes of a drill string, the responding devices can be embedded in logging while drilling (LWD) tools, measurement while drilling (MWD) tools, downhole motors, and other downhole tools.

Figure 9:
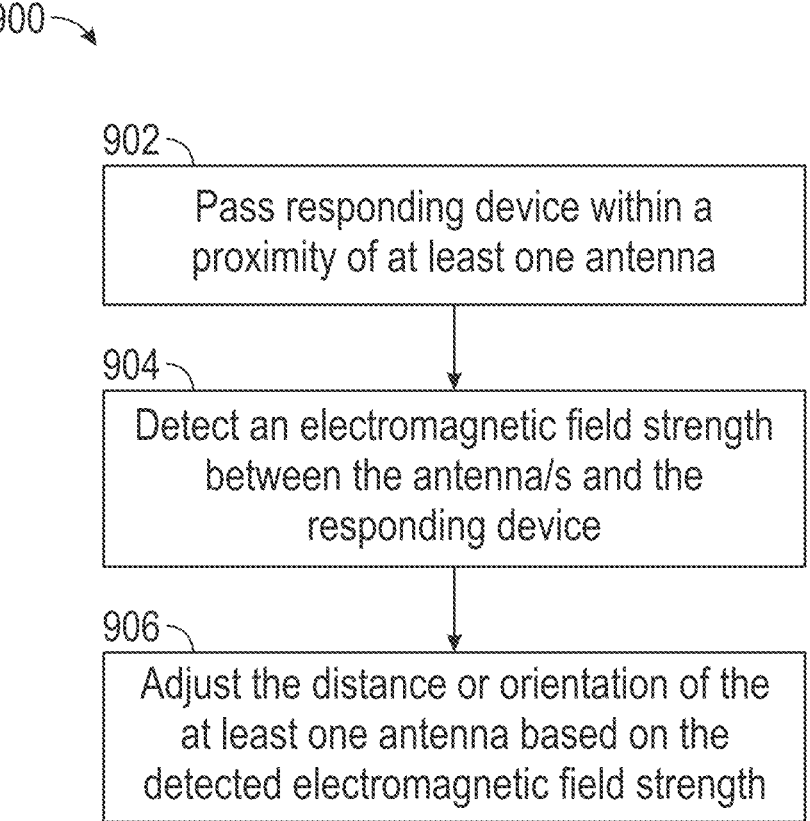
FIG. 9 is method for detection or identification an object, according to one or more embodiments.

FIG. 9 illustrates a method for detection or identification of tubular elements such as pipes. The method can be implemented by drill string control systems, or by control circuitry 312 or other elements of the system 300 (FIG. 3).

Method 900 can begin with operation 902 with passing an object 114 having a responding device 304 attached thereto within a proximity of at least one antenna (e.g., antenna 102, 104, 306, 308). The antenna/s 102, 104, 306, 308 can be spaced at an initial distance or orientation with respect to the object 114. In some embodiments, the responding device 304 includes an RFID device (e.g., "tag"). In some examples, the RFID device can be provided at various points on a surface of the object 114, for example top and bottom or spaced at different points along the circumference of the object 114.

The method 900 can continue with operation 904 with detecting an electromagnetic field strength between the at least one antenna 102, 104, 306, 308 and the responding device 304. In examples, the electromagnetic field strength can vary according to distance of the corresponding antenna 102, 104, 306, 308, or variations of the coordinates of antenna 102, 104, 306, 308 with the responding device 304 being considered the origin of this coordinate system.

The method 900 can continue with operation 906 with adjusting the distance or orientation of the at least one antenna 102, 104, 306, 308 based on the detected electromagnetic field strength. The adjusting of operation 906 can include changing the orientation or the distance of the at least one antenna 102, 104, 306, 308, relative to the object (e.g., tubular object 114 or responding device 304), in response to the electromagnetic field strength falling below a threshold. The adjusting can be done by position control circuitry 314 upon instructions or control signals provided by the control circuitry 312. In some embodiments, the position control circuitry 314 can adjust the orientation or the distance of the at least one antenna 102, 104, 306, 308 responsive to the object moving in a vertical, rotational, or horizontal direction. In some examples, with reference to FIG. 7 and FIG. 8, adjusting the orientation includes at least one of rotating the antenna 102, 104, 306, 308 clockwise in a plane about a Y axis; rotating the antenna 102, 104, 306, 308 counterclockwise in the plane about the Y axis; rotating the antenna 102, 104, 306, 308 clockwise in a plane about an X axis; rotating the antenna 102, 104, 306, 308 counterclockwise about the X axis; lifting the antenna 102, 104, 306, 308 up in a Z direction; or moving the antenna 102, 104, 306, 308 down in the Z direction.

Figure 10:
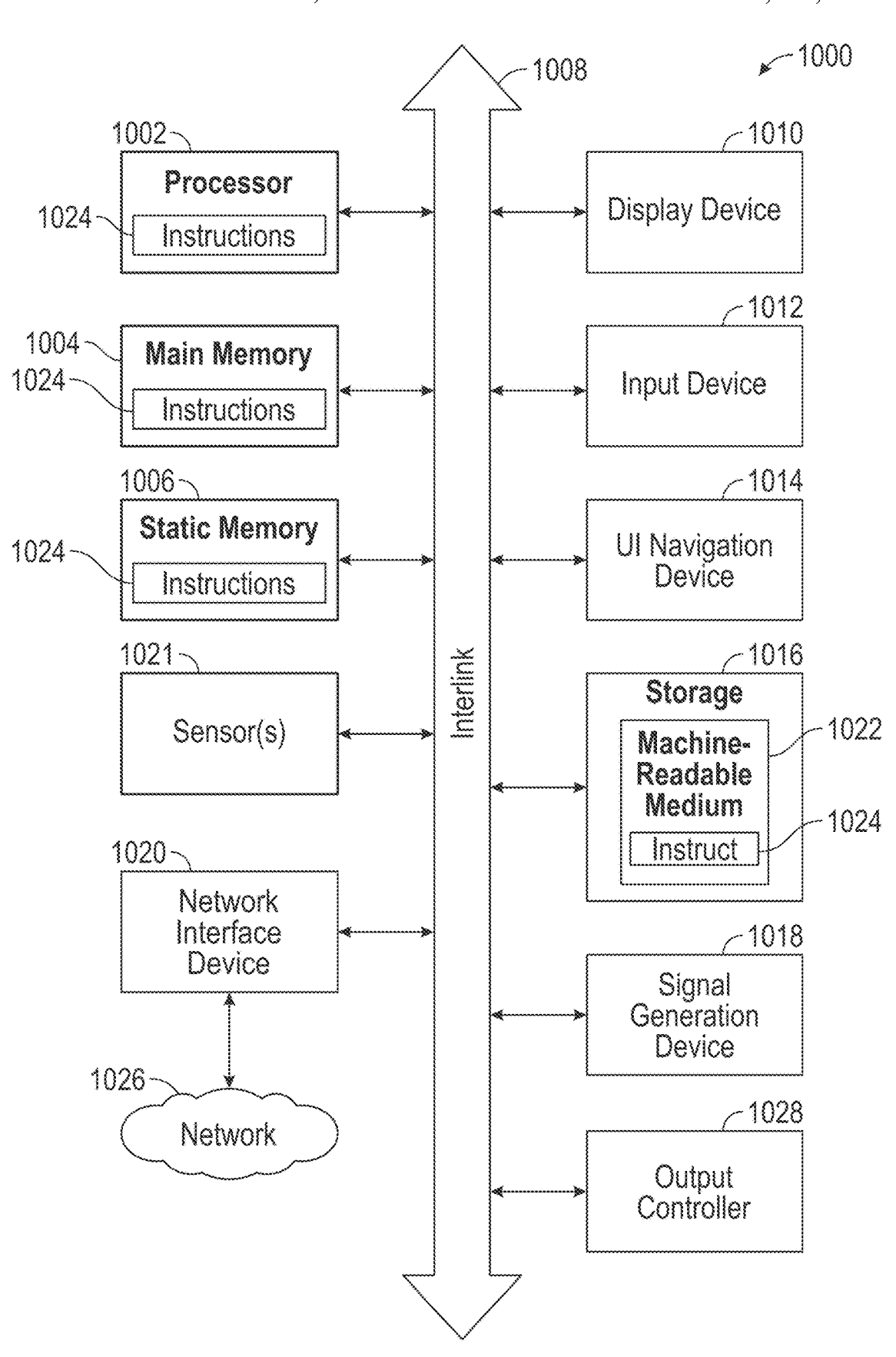
FIG. 10 is a computer system on which example embodiments can be implemented.

FIG. 10 illustrates generally an example of a block diagram of a machine 1000 upon which any one or more of the techniques (e.g., methodologies) discussed herein may perform in accordance with some embodiments. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The machine 1000 can act as control circuitry 312 or perform one or more of the operations of control circuitry 312 or provide communication inputs or outputs from the control circuitry 312 to operators or owners of a drilling operation.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer-readable medium containing instructions, where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, alphanumeric input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine-readable (or computer-readable) medium 1022 that is non-transitory on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), a legacy telephone network, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Various embodiments of the present disclosure may be described herein with reference to flowchart illustrations and/or block diagrams of methods, apparatus (systems), and computer program products. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A system for tracking drilling tubulars in a drill string defining a longitudinal axis, comprising:
    a tag arranged on a drilling tubular; and
    an antenna array comprising a plurality of antennas configured for capturing data from the tag, the plurality of antennas arranged in a radial pattern in a single plane, on a diameter ranging from 54 inches to 84 inches, and facing inward toward the longitudinal axis, the plurality of antennas being oriented such that a field window is established that extends 12 inches along the longitudinal axis and within which data is captured by the plurality of antennas.

2. The system of claim 1, wherein the antenna array is configured for capturing data from the tag operable at one of two frequencies including 865-868 MHz and 902-928 MHz.

3. The system of claim 1, further comprising one or more antennas arranged out of plane.

4. The system of claim 1, wherein the diameter ranges from 54 inches to 60 inches.

5. The system of claim 4, wherein the antenna array is configured for capturing data from the tag operable at either of two frequencies including 865-868 MHz and 902-928 MHz.

* * * * *